United States Patent [19]

Kusumoto et al.

[11] Patent Number: 4,535,102

[45] Date of Patent: Aug. 13, 1985

[54] ADHESIVE COATING MATERIAL

[75] Inventors: Kōshi Kusumoto, Kamakura; Toshio Kawaguchi, Fujisawa; Takeshi Nakahara, Fujisawa; Shinichiro Kunimoto, Fujisawa, all of Japan

[73] Assignee: Tokuyama Soda Kabushiki Kaisha, Yamaguchi, Japan

[21] Appl. No.: 539,417

[22] Filed: Oct. 6, 1983

[30] Foreign Application Priority Data

Nov. 24, 1982 [JP] Japan ................. 57-204683

[51] Int. Cl.$^3$ ............ C08F 267/02; C08F 265/02; C08K 5/05; A61K 6/08
[52] U.S. Cl. ..................... 523/116; 524/127; 524/128; 524/398; 524/531; 524/533; 525/285; 525/301; 525/937; 433/202.1; 433/228.1
[58] Field of Search .......... 523/116, 117, 115; 524/531, 533, 398; 525/285, 301, 937; 433/202, 228

[56] References Cited

U.S. PATENT DOCUMENTS

| | | | |
|---|---|---|---|
| 2,719,136 | 9/1955 | Caldwell | 525/285 |
| 3,453,246 | 7/1969 | Heilman | 525/285 |
| 3,769,254 | 10/1973 | Anderson | 525/327.8 |
| 3,986,998 | 10/1976 | Schmitt | 523/116 |
| 4,005,247 | 1/1977 | Graham | 525/327.8 |
| 4,082,722 | 4/1978 | Schmitt | 523/116 |
| 4,107,845 | 8/1978 | Lee | 523/116 |
| 4,182,035 | 1/1980 | Yamauchi | 523/116 |
| 4,235,981 | 11/1980 | Tsuchiya | 524/531 |
| 4,308,014 | 12/1981 | Kawahara | 433/228 |

FOREIGN PATENT DOCUMENTS

| | | | |
|---|---|---|---|
| 2711234 | 9/1977 | Fed. Rep. of Germany | 523/116 |
| 0113843 | 10/1978 | Japan | 523/116 |
| 0112921 | 9/1981 | Japan | 525/285 |
| 1507981 | 4/1978 | United Kingdom | 523/116 |

Primary Examiner—C. Warren Ivy
Attorney, Agent, or Firm—Sherman & Shalloway

[57] ABSTRACT

Disclosed is an adhesive coating material for a hard tissue, which comprises (1) a polymer having an acid value of 30 to 700 and including in recurring units a hydrophobic group and two carboxyl (—COOH) groups or one carboxylic anhydride

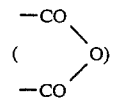

group bonded to the polymer, said carboxyl groups or carboxylic anhydride group being bonded to adjacent carbon atoms, and (2) a polymerizable vinyl compound or a mixture of said polymerizable vinyl compound and an organic titanate compound.

24 Claims, No Drawings

ADHESIVE COATING MATERIAL

BACKGROUND OF THE INVENTION (1) Field of the Invention

The present invention relates to an adhesive coating material for a hard tissue, which comprises a specific polymer and a specific compound in combination. More particularly, the present invention relates to an adhesive coating material for a hard tissue, which comprises (1) a polymer having an acid value of 30 to 700 and including in recurring units a hydrophobic group and two carboxyl (—COOH) groups or one carboxylic anhydride

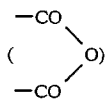

group bonded to the polymer, said carboxyl groups or carboxylic anhydride group being bonded to adjacent carbon atoms, and (2) a polymerizable vinyl compound or a mixture of said polymerizable vinyl compound acid and an organic titanate compound.

(2) Description of the Prior Art

Various compounds are known as adhesives applicable peculiarly in various fields. Among these adhesives, especially severe requirements are imposed on dental adhesives used to hard tissues in humid condition. Since a dental adhesive is used in the oral cavity, a high adhesion strength in the humid condition is required. Furthermore, this dental adhesive should have an adhesive force to both of hard tissue and a dental resinous restorative material comprising a polymerizable monomer and at least one member selected from inorganic, organic and inorganic/organic composite fillers.

As dental adhesives, Ionomer cement comprising an aqueous solution of polyacrylic acid and inorganic oxide, and a cold-setting adhesive comprising a polymerizable monomer are widely used.

The Ionomer cement has an adhesive force to the hard tissue, but no adhesive force to a dental resinous restorative material. And the Ionomer cement is readily separated from the bonded portion since its water resistance is low.

The cold-setting adhesive comprising a polymerizable monomer hardly adheres to the hard tissue without pretreatment. Accordingly, it is necessary that the hard tissue should be treated with a highly concentrated aqueous solution of phosphoric acid to prepare a mechanical retentive surface. This method, however, is defective in that even healthy hard tissue is damaged since phosphoric acid is used at a high concentration.

Special properties are required for adhesives according to their specific applications, and an adhesive usable in a certain field can seldom be used industrially in other fields. Accordingly, special adhesives are used in respective application fields, and also in the field of the dental treatment, development of an adhesive satisfying the foregoing requirements is eagerly desired.

SUMMARY OF THE INVENTION

Under the above-mentioned background, we carried out research with a view to developing a satisfactory adhesive coating material for a hard tissue, and we have now completed the present invention.

It is therefore a primary object of the present invention to provide an adhesive for a hard tissue, which can be bonded to a hard tissue directly without a pretreatment with an aqueous solution of phosphoric acid.

Another object of the present invention is to provide an adhesive which can be bonded with a sufficient adhesive force to a tooth and a dental resinous restorative material even in the mouth cavity in the humid condition and which was a high water resistance.

Other objects and advantages will become apparent from the description given hereinafter.

In accordance with a fundamental aspect of the present invention, there is provided an adhesive coating material for a hard tissue, which comprises (1) a polymer having an acid value of 30 to 700 and including in recurring units a hydrophobic group and two carboxyl (—COOH) groups or one carboxylic anhydride

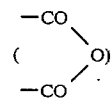

group bonded to the polymer, said carboxyl groups or carboxylic anhydride group being bonded to adjacent carbon atoms, and (2) a polymerizable vinyl compound or a mixture of said polymerizable vinyl compound and an organic titanate compound.

DETAILED DESCRIPTION OF THE INVENTION

One main component of the adhesive coating material of the present invention is a polymer including in recurring units a hydrophobic group and two carboxyl groups or one carboxylic anhydride group bonded to the polymer, said carboxyl groups or carboxylic anhydride group being bonded to adjacent carbon atoms. The reason why the hydrophobic group is introduced into the polymer used in the present invention is that a sufficient water resistance is given to the adhesive coating material, a good compatibility or affinity with a resin to be bonded, for example, a dental resinous restorative material, is imparted to the adhesive coating material and a sufficient adhesion strength is obtained even in the humid condition. Furthermore, in order to attain a sufficient adhesive strength to the hard tissue even in the humid condition, it is necessary that the two carboxyl groups or one carboxylic anhydride group should be bonded to adjacent carbon atoms in the polymer to be used in the present invention. Since the two carboxyl groups or one carboxylic anhydride group forms a bridge of a high strength with the organic titanate compound used as the other component of the present invention, an especially high water resistance is given to the adhesive coating material of the present invention. Moreover, in the adhesive coating material of the present invention, since the polymerizable vinyl monomer is polymerized in the state where the coating material is uniformly impregnated with the polymerizable vinyl compound, the adhesion strength of the adhesive coating material of the present invention is highly improved. Accordingly, the adhesive coating material of the present invention acts effectively as an adhesive between a hard tissue and a dental resinous restorative material such as a composite resin, especially in the humid condition. In view of the foregoing description, it is most preferred that the adhesive coating material of the present invention should comprise (1) a polymer including a hydrophobic group and two carboxyl groups or one carboxylic anhydride group bonded to adjacent carbon atoms, and (2-1) a polymerizable vinyl compound, or (2-2) a polymerizable vinyl compound and an organic titanate compound.

It also is important that the polymer that is used in the present invention should have an acid value of 30 to 700, especially 40 to 600. In the instant specification, the acid value is defined as the number of mg of KOH necessary for neutralizing 1 g of the polymer. This acid value indicates the concentration of the carboxyl groups or carboxylic anhydride group in the polymer. If the acid value is smaller than 30, the adhesiveness to the hard tissue is reduced and the number of cross-linking points to the organic titanate compound is reduced, with the result that the toughness of the resulting coating is degraded. If the acid value is larger than 700, the coating formed from the polymer is excessively hydrophilic, and the water resistance is reduced. A polymer having an acid value within the above-mentioned range is especially suitable as a dental adhesive coating material.

The kind of the hydrophobic group bonded to the polymer is not particularly critical in the present invention, and any of known hydrophobic groups may be used. As preferred examples of the hydrophobic group, there can be mentioned (1) aryl groups such as phenyl and naphthyl groups, (2) alkyl groups such as methyl, ethyl, propyl and butyl groups, (3) alkoxy groups such as ethoxy, propoxy and butoxy groups, and (4) acryloxy groups such as an acetyloxy group. These hydrophobic groups (1) through (4) may be substituted with other substituents, such as halogen atoms, e.g., chlorine, bromine, iodine and fluorine, and alkyl, alkoxy and phenoxy groups.

In many cases, the hydrophobic group is ordinarily introduced into the polymer from a starting material used for the production of the polymer, as described hereinafter. The kind of the hydrophobic group-giving starting material is not particularly critical, and a known vinyl monomer is preferably used. More specifically, there are preferably used styrene, halogenostyrene, methylstyrene, halogenomethylstyrene and vinylnaphthalene as the monomer having the hydrophobic group (1), propylene and isobutene as the monomer having the hydrophobic group (2), ethylvinyl ether and n-butyl ether as the monomer having the hydrophobic group (3) and vinyl acetate as the monomer having the hydrophobic group (4).

A monomer for introduction of the hydrophobic group, which is especially preferred in the present invention, is represented by the following general formula:

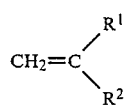

wherein $R^1$ stands for a hydrogen atom or an alkyl group, and $R^2$ stands for an aryl group, an alkyl group, an alkoxy group or an acyloxy group.

In the polymer used in the present invention, it is sufficient if the carboxyl groups or carboxylic anhydride group is finally bonded to adjacent carbon atoms, irrespectively of the preparation process. Ordinarily, a polymer having two carboxyl groups or one carboxylic anhydride group bonded thereto is preferably prepared by performing homopolymerization or copolymerization by using as the starting material a vinyl compound having two carboxyl groups or one carboxylic anhydride group bonded to adjacent carbon atoms, such as maleic acid, fumaric acid, itaconic acid, maleic anhydride or itaconic anhydride. Furthermore, there is preferably adopted a process in which a vinyl monomer having a carboxylic acid ester group or carboxylic anhydride group bonded to adjacent carbon atoms, such as maleic anhydride, maleic acid monoester, maleic acid diester, fumaric acid monoester or fumaric acid diester is used as one polymerizable component and copolymerized with other copolymerizable vinyl monomer, and the carboxylic anhydride group or carboxylic acid ester group of the formed copolymer is hydrolyzed to convert all or a part of the carboxylic anhydride group or carboxylic acid ester group to a carboxyl group.

The kind of the polymer that is used in the present invention is not particularly critical, so far as it includes in recurring units a hydrophobic group as mentioned above and two carboxyl groups or one carboxylic anhydride group and the two carboxyl groups or one carboxylic anhydride group is bonded to adjacent carbon atoms. In view of the availability and the handling easiness, it is industrially preferred that a polymer having an average molecular weight of 1,000 to 100,000, especially 2,000 to 50,000, be used. The process for the preparation of this polymer is not particularly critical. From the industrial viewpoint, however, there is preferably adopted a process in which a vinyl monomer having a hydrophobic group, such as mentioned above, is copolymerized with a vinyl monomer having a carboxyl group, a carboxylic acid ester group or a carboxylic anhydride group bonded to adjacent carbon atoms and, if necessary, the obtained polymer is then hydrolyzed.

A preferred polymer comprises (A) at least one kind of recurring units represented by the following formula:

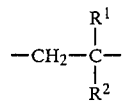

wherein $R^1$ stands for a hydrogen atom or an alkyl group, and $R^2$ stands for an aryl group, an alkyl group, an alkoxy group, an acyloxy group or an alkoxycarbonyl group, and (B) at least one kind of monomeric units represented by the following formula:

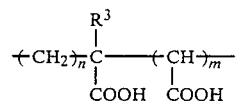

wherein $R^3$ stands for a hydrogen atom or a carboxymethyl group, n and m are numbers of zero or 1, with the proviso that when n is zero, m is 1 and $R^3$ is a hydrogen atom and when n is 1, m is zero and $R^3$ is a carboxymethyl group, and the two carboxyl groups may form a carboxylic acid anhydride group.

The above-mentioned copolymerization is not particularly critical. Ordinarily, however, there is preferably adopted a polymerization process in which a polymerization initiator described below is used. More specifically, there is preferably adopted a radical polymerization process using an organic peroxide such as benzoyl peroxide or lauroyl peroxide, an azo compound such as azobisisobutyronitrile, an organic metal compound such as tributyl boron or a redox type initiator.

In the above-mentioned copolymer, it is preferred that the vinyl monomer component having the hydrophobic group be contained in an amount of 40 to 90 mole %. If the content of the hydrophobic group-containing vinyl monomer is higher than 90 mole %, no satisfactory adhesive force to a hard tissue can be obtained. The reason is not sufficiently elucidated, but it is presumed that since the hydrophobic characteristics of the copolymer are increased, the affinity with the hard tissue will be reduced. If the hydrophobic group-containing vinyl monomer is contained in the copolymer in an amount smaller than 40 mole %, there is not a suitable process for imparting a carboxyl group or carboxylic anhydride group to this copolymer, and therefore, the production of this copolymer is difficult and the water resistance of an adhesive comprising this polymer is not sufficient. As is apparent from the foregoing description, the content of the hydrophobic group-containing vinyl monomer in the copolymer used in the present invention is very important.

The above-mentioned process in which the carboxylic acid ester group or carboxylic anhydride group is hydrolyzed is not particularly critical. Ordinarily, there is preferably adopted a process in which a copolymer comprising maleic anhydride, maleic acid diester, fumaric acid diester or itaconic acid diester is dissolved in an organic solvent, water and a small amount of an alkaline or acid component as a hydrolysis promoter are added to the solution and the reaction is carried out at room temperature or under heating.

A polymerizable vinyl compound is used as another component of the adhesive coating material of the present invention. The kind of the polymerizable vinyl compound is not particularly critical, and any of known polymerizable vinyl compounds can be used. For example, there can be used monovinyl compounds such as methyl acrylate, methyl methacrylate, 2-hydroxyethyl acrylate, 2-hydroxyethyl methacrylate, 2-hydroxypropyl acrylate, 2-hydroxypropyl methacrylate and glycidyl methacrylate, and polyvinyl compounds such as diacrylic acid esters and dimethacrylic acid esters of ethylene glycol, diethylene glycol, triethylene glycol, tetraethylene glycol, dipropylene glycol and butylene glycols, triacrylic acid esters and trimethacrylic acid esters of trimethylolpropane and trimethylolethane, tetraacrylic acid esters and tetramethacrylic acid esters of tetramethylolmethane, and bisphenol-A-diglycidyl methacrylate (hereinafter referred to as "bis-GMA"). These monovinyl compounds and polyvinyl compounds can be used singly or in the form of mixtures of two or more of them.

In the present invention, it is preferred that a vinyl compound represented by the following formula:

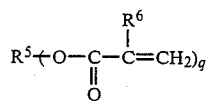

wherein $R^5$ stands for an organic group free of an ethylenic unsaturation, $R^6$ stands for a hydrogen atom or an alkyl group, and q is an integer of from 1 to 4, be used as the polymerizable vinyl compound.

In view of the toughness, water resistance and adhesiveness of the formed coating, it is preferred that the polymerizable vinyl compound or at least one polymerizable vinyl compound when a plurality of polymerizable vinyl compounds are used be a vinyl compound having at least two ethylenic unsaturations, and in the present invention, it is especially preferred that one or more of polymerizable vinyl compounds be used so that the functional index (F.I.) defined by the following formula:

$$F.I. = \sum_{m=1}^{n} m \cdot Mm$$

wherein m stands for the number of vinyl groups (ethylenic unsaturations) in the vinyl compound and Mm stands for a molar fraction of the vinyl compound containing m of vinyl groups, is 1.0 to 3.5, especially 1.1 to 3.3, particularly especially 1.3 to 3.0. If the F.I. value is smaller than 1.0, the toughness of the formed coating is degraded, and if the F.I. value is larger than 3.5, the formed coating is relatively brittle.

From the viewpoint of the adaptability of the composite resin-filling operation conducted after formation of the coating, it is preferred that the polymerizable vinyl compound should contain a hydroxyl group in an amount of 50 to 800 millimoles, especially 70 to 600 millimoles, per 100 g of the vinyl compound. If the hydroxyl group concentration is too low and below the above range, the filled composite resin is not bonded to the formed coating and is readily separated, and if the hydroxyl group concentration is too high and exceeds the above range, the water resistance of the formed coating is insufficient.

An organic titanate compound is used as still another component of the adhesive coating material of the present invention. The kind of the organic titanate compound is not particularly critical, and any of known organic titanate compounds can be used. For example, there can be mentioned tetra-isopropyl titanate, tetra-n-butyl titanate, tetrakis(2-ethylhexyl)titanate, tetrastearyl titanate, di-iso-propoxy-bis(acetylacetone) titanate, di-n-butoxybis(triethanolamine)titanate, dihydroxy-bis(lactic acid)titanate, tetraoctylene glycol titanate, tri-n-butoxymonostearyl titanate, isopropyltriiso-stearoyl titanate, isopropyltridecyl-benzene-sulfonyl titanate, isopropyl-tris(dioctylpyrophosphate)titanate, tetra-isopropyl-bis(dioctyl phosphite)titanate, tetraoctyl-bis(ditridecyl phosphite)titanate, tetra(2,2-diallyloxymethyl-1-butyl)-bis(ditridecyl phosphite)titanate, bis(dioctyl pyrophosphate)oxyacetate titanate and bis(dioctyl pyrophosphate)ethylene titanate. These organic titanate compounds may be used singly or in the form of mixtures of two or more of them. Moreover, polymers of these titanates may be used.

In the present invention, an organic titanate represented by the following formula:

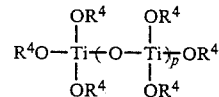

wherein $R^4$ stands for an alkyl group and p is a number of from 0 to 20,
especially a tetraalkyl titanate, is preferably used as the organic titanate compound.

The adhesive coating material of the present invention comprises the above-mentioned polymer, and a polymerizable vinyl compound or a mixture of said polymerizable vinyl compound and an organic titanate compound as the constituent components. The mixing ratio of these main components is not particularly critical, so far as the intended adhesive effect is attained. However, it is ordinarily preferred that the polymer be incorporated in an amount of 0.1 to 40% by weight based on the polymerizable vinyl compound. If the organic titanate compound is used, it is preferred that the amount used of the organic titanate compound be used in an amount of 0.02 to 2 moles per mole of the unit having the bonded carboxyl group or carboxylic anhydride group in the polymer.

In the present invention, when the polymerizable vinyl compound is used as one component of the adhesive coating material, in order for the adhesive coating material to exert sufficient functions, it is necessary that a catalyst should be added. Any of known catalysts can be used, so far as it is capable of polymerizing the vinyl compound. Ordinarily, a radical initiator, for example, a mixture of a peroxide and an amine, is preferably used. A peroxide customarily used as a curing agent can be used, and dibenzoyl peroxide (hereinafter referred to as "BPO") and dilauroyl peroxide are preferably used. As the amine, there are preferably used N,N'-dimethylaniline, N,N'-dimethyl-toluidine (hereinafter referred to as "DMPT"), N-methyl-N'-β-hydroxyethylaniline, N,N'-dimethyl-p-(β-hydroxyethyl)-aniline and N,N'-di(β-hydroxyethyl)-p-toluidine (hereinafter referred to as "DEPT").

If a sulfinic acid salt and/or a carboxylic acid salt is used as an promotor together with the radical initiator, good results are often obtained. The kind of the sulfinic acid salt is not particularly critical, and known sulfinic acid salts may be used. However, it is ordinarily preferred that a salt of a sulfinic acid bonded to an alkyl or aryl group be used. As especially preferred examples, there can be mentioned alkali metal salts such as sodium and potassium salts, alkaline earth metal salts such as calcium and strontium salts, ammonium salts, trialkyl ammonium salts and N,N'-dimethyl-p-toluidine salts of benzene-sulfinic acid, p-toluene-sulfinic acid, β-naphthalene-sulfinic acid and styrene-sulfinic acid. Any of known metal salts of carboxylic acids can be used as another type of the promotor without any limitation. Furthermore, a monobasic carboxylic acid or a polybasic carboxylic acid such as a dicarboxylic acid or a tricarboxylic acid may be used. In case of a polybasic carboxylic acid, a poly-metal salt such as a di-metal salt is preferably used rather than a mono-metal salt. As specific examples of the carboxylic acid component of the promotor, there can be mentioned aliphatic carboxylic acids such as formic acid, acetic acid, propionic acid, butyric acid, valeric acid, lauric acid, stearic acid, pyruvic acid, methoxyacetic acid and acetoacetic acid, aromatic carboxylic acids such as benzoic acid, phenylacetic acid and salicylic acid, hydroxycarboxylic acids such as glycolic acid and lactic acid, dicarboxylic acids such as oxalic acid, succinic acid, adipic acid, tartaric acid, maleic acid, fumaric acid and phthalic acid, and vinyl carboxylic acids such as acrylic acid, methacrylic acid and vinylacetic acid. As the carboxylic acid salt, there are preferably used alkali metal salts such as sodium and potassium salts, alkaline earth metal salts such as magnesium and calcium salts, iron salts, copper salts, zinc salts and silver salts of the above-mentioned carboxylic acids.

In the present invention, the amounts used of the radical initiator and promotor are not particularly critical, and they are appropriately determined according to the kinds of the polymerizable vinyl monomer, radical initiator and promotor and the application conditions. Ordinarily, the radical initiator is used in an amount of 0.01 to 3% by weight based on the polymerizable vinyl compound, and the promotor is used in an amount of 40 to 600% by weight based on the radical initiator.

In the case where the organic titanate compound is used as one component of the adhesive coating material of the present invention, in order to use the adhesive coating material in a more stable state, it is preferred that a stabilizer for the organic titanate compound be used. Especially in the case where a solvent containing water is used when the adhesive coating material of the present invention is actually applied, it is often preferred that a stabilizer for the organic titanate compound be used. An appropriate stabilizer is selected and used according to the application mode of the adhesive coating material of the present invention. For example, when an o-alkoxybenzoic acid such as o-methoxybenzoic acid, o-ethoxybenzoic acid or o-propoxybenzoic acid, or a β-hydroxycarboxylic acid such as hydroacrylic acid, β-hydroxybutyric acid or β-hydroxyisovaleric acid, is used as the stabilizer, a one-pack type product comprising a solvent solution of the above-mentioned polymer and organic titanate compound in one packing vessel can be provided. When an α-hydroxycarboxylic acid such as lactic acid, α-hydroxy-n-butyric acid or mandelic acid, a β-hydroxyalkyl acrylate or methacrylate such as β-hydroxyethyl methacrylate, β-hydroxypropyl acrylate or glycerin dimethacrylate, a catechol derivative such as catechol, guaiacol or eugenol, a proline derivative such as proline, 4-methylene-proline or 4-methyl-proline, or a cyclic ester such as β-butyrolactone, γ-butyrolactone or β-caprolactone, is used as the stabilizer for the organic titanate compound, the adhesive coating material of the present invention is applied in the form of a two-pack type product in which a solvent solution of the above-mentioned polymer and a solvent solution of the organic titanate compound and the stabilizer are contained in different vessels and both the solutions are mixed together at the time of application. The kind of the solvent to be used for the one-pack type or two-pack type product is not particularly critical, and an appropriate solvent is selected among known solvents. Ordinarily, there are preferably used alcohols such as ethyl alcohol and isopropyl alcohol, esters such as ethyl acetate, and dioxane and tetrahydrofuran. The amount added of the stabilizer for the organic titanate compound differs according to the kind of the stabilizer and it is not sweepingly determined. However, it is ordinarily preferred that the stabilizer be used in an amount of 0.1 to 4 moles, especially 0.5 to 2 moles, per mole of the organic titanate compound. The stabilizer may be mixed with the organic titanate compound in advance or it may be added to the organic titanate compound together with other ingredients.

In the case where the above-mentioned polymer and polymerizable vinyl compound are selected as the main components of the adhesive coating material of the present invention, it is necessary, as point out hereinbefore, that the radical initiator and promotor should be used. In this embodiment, in order to prevent deterioration of the polymerizable vinyl compound, it is necessary that the organic peroxide and amine compound of the radical initiator should be contained in different vessels. Accordingly, in this embodiment, there should be adopted a two-pack or three-pack type product system in which the ingredients are mixed at the time of application. This embodiment will now be described more specifically. The above-mentioned polymer, the polymerizable vinyl compound and the organic peroxide are contained in one vessel, and the amine compound is contained in another vessel, if necessary in the form of a solution in a solvent. At the time of application, the contents of both the vessels are mixed together. When a sulfinic acid salt or carboxylic acid salt is used as the assistant, it is preferred that the assistant be contained in the vessel where the amine compound is contained.

In the case where the above-mentioned polymer, polymerizable vinyl compound and organic titanate compound are selected and used as the main components of the adhesive coating material, a two-pack system or three-pack system is adopted according to the kind of the stabilizer for the organic titanate compound. More specifically, when o-alkoxybenzoic acid or β-hydroxycarboxylic acid of the above-mentioned one-pack type is used as the stabilizer for the organic titanate compound, the polymer, polymerizable vinyl compound, organic titanate, stabilizer and organic peroxide are contained in one vessel and the amine compound and sulfinic acid salt or carboxylic acid salt are contained in another vessel. These components are used in the form of solvent solutions, if necessary. At the time of application, appropriate amounts of the contents of both the vessels are taken out and are mixed together. When the stabilizer other than of the one-pack type is used, there is preferably adopted a three-pack system in which the organic titanate compound and the stabilizer for the organic titanate compound are contained in still another vessel independently from the polymer, polymerizable vinyl compound and organic peroxide.

As is apparent from the foregoing description, the adhesive coating material of the present invention has a very high adhesiveness to a hard tissue and a dental resinous restorative material, and this adhesiveness is excellent even in the humid condition. Accordingly, the adhesive coating material of the present invention can be used especially advantageously as a dental restorative material. By the term "dental restorative material" is meant a material which is used for remedy and restoration of a tooth and is coated on the surface of the tooth or the surface of the cavity formed on the tooth, and this is the most important use for the adhesive coating material of the present invention. As the dental restorative material, there can be mentioned, for example, a tooth adhesive, a protective lining material for the dental pulp and a border sealer for a tooth and a restorative material.

An embodiment where the adhesive coating material of the present invention is used as a dental restorative material will now be described.

In the conventional method of remedy and restoration of teeth, when a filler such as a composite restorative resin is filled in a cavity of a tooth, an adhesive is used for bonding the filler to the dentin. However, since a conventional adhesive has no substantial adhesiveness to the dentin, it is necessary to treat the dentin in advance with an aqueous solution of phosphoric acid having a high concentration to effect deliming and a prepare a mechanical retention system. This method, however, is defective in that since an aqueous solution of phosphoric acid having a high concentration is used, even the healthy dentin is damaged. Especially when the dentin is etched, attainment of any substantial adhesive force cannot be expected and it is anticipated that even the pulp will be influenced by the aqueous solution of phosphoric acid introduced through ductules of the dentin. Furthermore, in the above-mentioned method, since an unreacted monomer is inevitably left, there is a risk of damage of the pulp by this monomer.

In contrast, when the adhesive coating material of the present invention is used, since the pretreatment with an aqueous solution of phosphoric acid is not necessary and the adhesive coating material can directly be bonded to the dentin, there is no risk of damage of the pulp by an unreacted monomer.

A lining material of the calcium hydroxide type or a cement has heretofore been used as the protecting lining material for the pulp. This lining material is used for protecting the dentin from the phosphoric acid etching conducted at the step of filling a filler such as a composite restorative resin. However, if the conventional lining material is used, increase of the thickness of the coating cannot be avoided, and the conventional lining material has no adhesive force to a filler. Accordingly, the conventional lining material can hardly be used for filling of a shallow cavity in a tooth. In contrast, when the adhesive coating material of the present invention is dissolved in an organic solvent and is used as the lining material, the dentin can be protected from the phosphoric acid etching even though the formed coating layer is very thin, and furthermore, the material exerts an excellent function of being bonded to a restorative material.

A zinc phosphate cement which is often used for bonding a metal to the hard tissue involves a risk of damage of the pulp because it contains a large amount of phosphoric acid. Therefore, the treatment with this cement inherently needs the use of a lining material for protection of the dentin. However, in case of the conventional lining material providing a thick coating layer, the compressive strength of the coating material is insufficient and the conventional lining material cannot be used for this purpose. When the adhesive coating material is used as a lining material of the above-mentioned type, since the coating layer is very thin, a high compressive strength is not necessary for the coating layer, and moreover, this thin coating layer does not allow permeation of phosphoric acid. Accordingly, the adhesive coating material exerts ideal effects.

As the third function of the adhesive coating material, there can be mentioned the improvement of a border sealing property.

As the known substance expected to exert this function, there can be mentioned, for example, a solution of a resin such as copalite (tradename) in an organic solvent which is used for filling of amalgam. Indeed, this material provides a thin coating layer, but the material has no adhesive force to the dentin or amalgam, and no substantial border sealing effect can be attained. In contrast, if the adhesive, coating material of the present invention is used as a border sealer, a high border sealing effect can be attained. In view of the fact that the adhesive coating material of the present invention can be bonded to the dentin but cannot be bonded to amalgam, it is considered that the above function is due to properties other than the adhesiveness, for example, the close adhesion and hydrophobic property.

When the adhesive coating material of the present invention is used for the filling operations other than the amalgam filling, for example, the restorative composite resin filling, the cement filling and the rubber capping, the border sealing effect can be improved.

The adhesive coating material of the present invention can be applied to uses other than the above-mentioned uses. For example, when it is intended to remove the material filled in the cavity of a tooth or to restore a wedge-shaped defect on the neck of the tooth, if the adhesive coating material is coated, it can effectively act as an insulating material to external stimulant.

The functions of the adhesive coating material of the present invention as the dental adhesive, the protective lining material for the pulp and the border sealer have independently been described. Since the adhesive coating material of the present invention has these functions in combination, if the coating material of the present invention is applied to the treatment of one case, all of these functions can be exerted at one time. According to the conventional technique, a plurality of materials should be used in combination for the treatment of one case, and hence, the operation becomes complicated, and the functions of the respective materials are degraded because of the combined application of the materials. If this fact is taken into consideration, it will readily be understood that the adhesive coating material of the present invention is very valuable as a dental restorative material.

When the adhesive coating material of the present invention is used as a dental restorative material, it is important that the polymer used as one component should have a carboxyl group or carboxylic anhydride group in addition to the hydrophobic group, and because of the presence of the carboxyl group or carboxylic acid anhydride group, the function as the dental restorative material is further improved. Namely, the water resistance is improved so that the above function can sufficiently be exerted even under the severe condition in the oral cavity, that is, 100% relative humidity. When the adhesive coating material is used as an adhesive for bonding a composite restorative resin to the dentin, since the carboxyl group or carboxylic anhydride group has an affinity with the dentin and the hydrophobic group has an affinity with the composite restorative resin, the adhesive force is highly improved over adhesive forces attainable by conventional adhesives.

The present invention will now be described in detail with reference to the following Examples that by no means limit the scope of the invention.

PRODUCTION EXAMPLE 1

A 500 ml-capacity glass separable flask was charged with 200 ml of cyclohexane, and 5.2 g of styrene, 4.9 g of maleic anhydride and 0.05 g of benzoyl peroxide (hereinafter referred to as "BPO") were added and the mixture was sufficiently stirred.

Then, the pressure in the vessel was reduced and the atmosphere was replaced with nitrogen, and the mixture was heated at 80° C. with stirring for 4 hours to effect polymerization. The reaction mixture was cooled to room temperature and the formed precipitate was recovered by filtration. The obtained solid was sufficiently washed with 300 ml of benzene and dried to obtain 8.7 g of a white polymer. When the composition of the formed copolymer was determined by the elementary analysis, it was found that the copolymer comprised 48.4 mole % of styrene and 51.6 mole % of maleic anhydride.

Then, the product was dissolved in 80 ml of dioxane, and the solution was charged into a 500 ml-capacity flask and 100 ml of an aqueous solution of potassium hydroxide having a concentration of 5% by weight was added to the solution with sufficient stirring. Reaction was carried out at room temperature for 10 hours. Then, concentrated hydrochloric acid was added to the reaction mixture to effect neutralization, and an excessive amount of hydrochloric acid was further added to obtain a white solid precipitate. The solid was recovered by filtration and it was washed with water repeatedly until the solid became neutral, and the solid was dried to obtain 8.0 g of a copolymer. When the product was subjected to the infrared absorption spectrum analysis, it was found that characteristic absorptions attributed to the carbonyl group of maleic anhydride at 1850 $cm^{-1}$ and 1775 $cm^{-1}$ completely disappeared and a characteristic absorption attributed to the carbonyl group of maleic acid newly appeared at 1720 $cm^{-1}$. Thus, it was confirmed that the hydrolysis reaction was advanced substantially quantitatively. Namely, it was confirmed that the obtained white solid was a copolymer comprising 48.4 mole % of styrene and 51.6 mole % of maleic acid. Incidentally, the acid value of the polymer was 370.

PRODUCTION EXAMPLE 2

A solution of 10 g of a commercially available styrene-maleic anhydride copolymer having a molecular weight of 50,000 (supplied by Monsanto Co.) in 200 ml of dioxane was charged in a 500 ml-capacity flask, and 10 g of distilled water was added to the solution with sufficient stirring and the mixture was heated at 100° C. for 4 hours with stirring. The solution was cooled to room temperature and thrown into 2 liters of distilled water to precipitate a white cotton-like polymer. When the polymer was washed with water and dried, 9.8 g of a white solid was obtained. From the results of the elementary analysis and infrared absorption spectrum analysis, it was confirmed that a styrene-maleic acid copolymer was obtained. Incidentally, the acid value of the polymer was 367.

PRODUCTION EXAMPLES 3 AND 4

In the same manner as described in Production Example 1, two commercially available styrene-maleic anhydride copolymers (supplied by Arco Chemical Co.) differing in the composition as shown in Table 1 were hydrolyzed. From the results of the elementary analysis of the starting copolymers and the results of the infrared absorption spectrum analysis of the hydrolyzed copolymers, it was confirmed that styrene-maleic acid copolymers having compositions shown in Table 1 were obtained. The molecular weights of the copolymers were 1,700 and 1,900, and the acid values of the copolymers were 251 and 184.

TABLE 1

| Production Example No. | Tradename of Commercially Available Maleic Anhydride-Styrene Copolymer | Composition of Styrene-Maleic Acid Copolymer | |
|---|---|---|---|
| | | styrene (mole %) | maleic acid (mole %) |
| 3 | SMA 2000 | 66.7 | 33.3 |

TABLE 1-continued

| Production Example No. | Tradename of Commercially Available Maleic Anhydride-Styrene Copolymer | Composition of Styrene-Maleic Acid Copolymer | |
|---|---|---|---|
| | | styrene (mole %) | maleic acid (mole %) |
| 4 | SMA 3000 | 75.1 | 24.9 |

PRODUCTION EXAMPLE 5

A pressure glass vessel having an inner capacity of 300 ml was charged with 50 ml of benzene containing 35 g of maleic anhydride and 90 mg of azobisisobutyronitrile (hereinafter referred to as "AIBN"), and the inner atmosphere was replaced by nitrogen under reduced pressure while cooling in a dry ice-methanol bath. Then, 12 g of propylene was introduced into the reaction vessel by distillation through a liquefaction meter, and the mixture was stirred at 60° C. for 36 hours to effect copolymerization. After the termination of the polymerization, the content was thrown into a large amount of anhydrous ether to precipitate the formed copolymer. The polymer was sufficiently washed by decantation and promptly dried in a reduced pressure dryer. The yield was 60%. From the results of the elementary analysis, it was found that the copolymer comprised 55.6 mole % of maleic anhydride and 44.4 mole % of propylene.

Then, the product was hydrolyzed in the same manner as described in Production Example 1 to obtain 24.2 g of a propylene-maleic acid copolymer. From the results of the infrared absorption spectrum analysis, it was confirmed that the maleic anhydride group in the starting copolymer was converted to maleic acid substantially quantitatively. Incidentally, the acid value of the polymer was 508.

PRODUCTION EXAMPLE 6

A pressure glass vessel having an inner capacity of 300 ml was charged with 50 ml of benzene containing 35.7 g of maleic anhydride and 90 mg of AIBN, and 12.5 g of isobutene was introduced into the reaction vessel by distillation through a liquefaction meter and copolymerization was carried out at 60° C. for 15 minutes. After the termination of the polymerization, the content was thrown into a large amount of anhydrous ether to precipitate the formed copolymer, and the supernatant was discarded by decantation and the residue was sufficiently washed with anhydrous ether and then dried under reduced pressure. The yield was 43.3%. From the results of the elementary analysis, it was found that the product was a copolymer comprising 47.1 mole % of isobutene and 52.9 mole % of maleic anhydride.

In the same manner as described in Production Example 1, the product was hydrolyzed to obtain 20.5 g of an isobutene-maleic acid copolymer. From the results of the infrared absorption spectrum analysis of this copolymer, it was confirmed that the maleic anhydride group in the starting copolymer was converted to maleic acid substantially quantitatively. Incidentally, the acid value of this copolymer was 470.

PRODUCTION EXAMPLE 7

A 500 ml-capacity glass separable flask was charged with 200 ml of benzene, and 5.3 g of n-butylvinyl ether, 4.9 g of maleic anhydride and 0.05 g of AIBN were added and the mixture was sufficiently stirred.

Then, the pressure in the vessel was reduced and the inner atmosphere was replaced by nitrogen, and heat polymerization was carried out at 60° C. for 6 hours and the formed precipitate was recovered by filtration. From the results of the elementary analysis, it was found that the formed copolymer comprised 49.8 mole % of n-butylvinyl ether and 50.2 mole % of maleic anhydride. Then, the product was dissolved in 200 ml of dioxane and the solution was charged in a 500 ml-capacity flask, and 10 g of distilled water was added under sufficient stirring and the mixture was heated and stirred at 60° C. for 2 hours. The obtained polymer solution was solidified by dry ice-methanol and then freeze-dried to obtain 10.1 g of a white solid. From the results of the infrared absorption spectrum analysis of the product, it was confirmed that the majority of the maleic anhydride group in the starting copolymer was converted to a maleic acid group. Incidentally, the acid value of the polymer was 375.

PRODUCTION EXAMPLE 8

A commercially available n-octadecylvinyl ether-maleic anhydride copolymer (supplied by Polysciences, Inc.) was hydrolyzed in the same manner as described in Production Example 2. From the results of the elementary analysis of the starting copolymer and the results of the infrared absorption spectrum analysis of the hydrolyzed copolymer, it was confirmed that the product was an n-octadecylvinyl ether-maleic acid copolymer having an acid value of 196.

PRODUCTION EXAMPLE 9

In 200 g of dioxane were dissolved 30 g of itaconic acid and 20 g of styrene, and BPO was added to the solution in an amount of 0.1% based on the monomers and polymerization was carried out at 10° C. for 5 hours. The reaction mixture was thrown in 1 liter of hexane, and the precipitate was recovered by filtration, dried and washed with distilled water to remove unreacted itaconic acid. The yield was 4.2%. From the results of the elementary analysis, it was found that the product was a copolymer comprising 49.0 mole % of itaconic acid and 51.0 mole % of styrene. The acid value of the polymer was 340.

PRODUCTION EXAMPLE 10

Styrene was copolymerized with diethyl fumarate at 60° C. for 20 hours by using AIBN as the initiator. From the results of the elementary analysis of the formed polymer, it was found that the formed polymer was a copolymer comprising 56.5 mole % of styrene and 43.5 mole % of diethyl fumarate. Then, 0.5 g of the polymer was charged in an Erlenmeyer flask having an inner capacity of 100 ml, and 30 ml of concentrated sulfuric acid was added and the mixture was allowed to stand still. In 2 days, the polymer was completely dissolved and a yellow solution was obtained. When the solution was poured into a large amount of ice water, a styrene-fumaric acid copolymer was precipitated. The precipitate was recovered by filtration, washed sufficiently with water repeatedly and dried to obtain 0.45 g of a solid. The acid value of the polymer was 93.

PRODUCTION EXAMPLE 11

A commercially available vinyl acetate-maleic anhydride copolymer (supplied by Polysciences, Inc.) was hydrolyzed in the same manner as described in Production Example 7. From the results of the elementary analysis of the starting copolymer and the results of the infrared absorption spectrum analysis of the hydrolyzed copolymer, it was found that the product was a vinyl acetate-maleic acid copolymer. The acid value of the polymer was 399.

PRODUCTION EXAMPLE 12 p-Chlorostyrene was copolymerized with maleic anhydride by using BPO as the initiator under the same conditions as adopted in Production Example 1. From the results of the elementary analysis of the obtained copolymer, it was found that the obtained copolymer comprised 47.9 mole % of p-chlorostyrene and 52.1 mole % of maleic anhydride. The product was hydrolyzed in the same manner as described in Production Example 7. From the results of the elementary analysis of the formed polymer and the results of the infrared absorption spectrum analysis of the hydrolyzed polymer, it was confirmed that the product was a chlorostyrene maleic acid copolymer. The acid value of this polymer was 318.

PRODUCTION EXAMPLE 13 p-Chloromethylstyrene was copolymerized with maleic anhydride by using BPO as the initiator under the same conditions as adopted in Production Example 1. From the results of the elementary analysis of the obtained copolymer, it was found that the formed copolymer comprised 48.9 mole % of p-chloromethylstyrene and 51.1 mole % of maleic anhydride. The product was hydrolyzed in the same manner as described in Production Example 7. From the results of the elementary analysis of the formed polymer and the results of the infrared absorption spectrum analysis of the hydrolyzed copolymer, it was confirmed that the product was a p-chloromethylstyrene-maleic acid copolymer. The acid value of this polymer was 301.

EXAMPLE 1

Liquid (I) shown in Table 2 was prepared by using a commercially available styrene/maleic anhydride copolymer (SMA 1000 supplied by Arco Chemical), and liquid (II) was prepared by adding the catalyst and promotor shown in Table 2 to 100 parts by weight of ethanol. The adhesive strength of an adhesive coating material formed from these liquids (I) and (II) was determined according to the following procedures.

Pastes (A) and (B) were prepared according to the following recipes.

| Paste (A): | |
| --- | --- |
| Bis-GMA | 11.0 parts by weight |
| Triethylene glycol dimethacrylate (hereinafter referred to as "TEGDMA") | 10.5 parts by weight |
| DMPT | 0.5 part by weight |
| Silane-treated quartz powder (having particle size smaller than 80 microns) | 78.0 parts by weight |
| Paste (B): | |
| Bis-GMA | 11.0 parts by weight |
| TEGDMA | 10.5 parts by weight |
| BPO | 1.0 part by weight |
| Silane-treated quartz powder (having particle size smaller than 80 microns) | 78.0 parts by weight |

The lip side surface of a freshly extracted bovine tooth was polished by emery paper (#320) to expose a smooth dentin, and nitrogen gas was blown to dry the surface. Then, a plate-like wax having a through hole having a diameter of 4 mm was attached to the dried surface by using a double-coated tape. Then, the adhesive liquids (I) and (II) were mixed at a ratio of 1:1 and the mixture was coated on the dentin surface surrounded by the plate-like wax, and nitrogen gas was blown to sweep off the excessive adhesive. Then, the pastes (A) and (B) were mixed at a ratio of 1:1 and the mixture was filled onto the adhesive coating. After standing for 1 hour, the plate-like wax was removed, and the treated tooth was dipped in water maintained at 37° C. for 24 hours and the tensile strength was measured at a pulling speed of 10 mm/min by using Tensilon supplied by Toyo-Baldwin. The obtained results are shown in Table 2.

Incidentally, the trifunctional monomer and polyfunctional monomer referred to in Table 2 and subsequent Tables are the following monomers.

Trifunctional Monomer

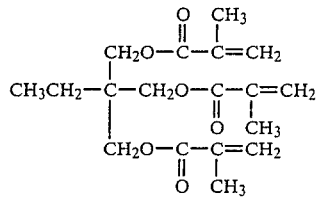

Polyfunctional Monomer

The polyfunctional monomer is a mixture of the following monomers (i), (ii) and (iii):

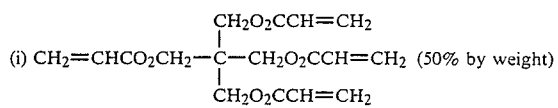

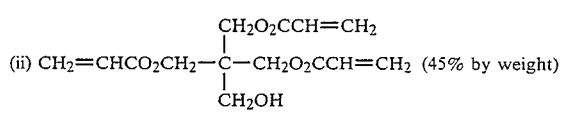

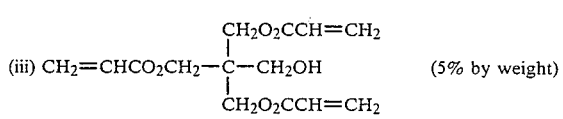

TABLE 2

| | | | Liquid (II) | | | |
| --- | --- | --- | --- | --- | --- | --- |
| Run No. | Polymer (parts by weight) | Liquid (I) Polymerizable Vinyl Compound (parts by weight) (F.I.) | Peroxide Catalyst (parts by weight) | Amine Catalyst (parts by weight) | Promotor (parts by weight) | Adhesive Strength (Kg/cm$^2$) to Dentin |
| 1 | SMA 100 (10) | 2-hydroxyethyl methacrylate (90) (1.0) | BPO (1) | DEPT (1.5) | sodium p-toluene- | 20.5 |

TABLE 2-continued

| Run No. | Polymer (parts by weight) | Liquid (I) Polymerizable Vinyl Compound (parts by weight) (F.I.) | Liquid (II) Peroxide Catalyst (parts by weight) | Amine Catalyst (parts by weight) | Promotor (parts by weight) | Adhesive Strength (Kg/cm²) to Dentin |
|---|---|---|---|---|---|---|
| 2 | " | triethylene glycol dimethacrylate (90) (2.0) | " | " | sulfinate (3.0) sodium p-toluenesulfinate (3.0) | 37.1 |
| 3 | " | 2-hydroxyethyl methacrylate (30) (1.0), triethylene glycol dimethacrylate (60) (1.5) | " | " | sodium p-toluenesulfinate (3.0) | 39.2 |
| 4 | " | 2-hydroxyethyl methacrylate (25) (1.0), triethylene glycol dimethacrylate (55) (1.5), bis-GMA (35) (1.6) | " | " | sodium p-toluenesulfinate (3.0) | 34.2 |
| 5 | " | 2-hydroxyethyl methacrylate (34) (1.0), triethylene glycol dimethacrylate (76) (1.5), bis-GMA (14) (1.6) | " | " | sodium p-toluenesulfinate (3.0) | 35.5 |
| 6 | " | triethylene glycol dimethacrylate (15) (1.5), bis-GMA (21) (1.6), trifunctional monomer (54) (2.6) | " | " | sodium p-toluenesulfinate (3.0) | 31.1 |
| 7 | " | triethylene glycol dimethacrylate (15) (1.5), bis-GMA (21) (1.6), polyfunctional monomer (54) (2.9) | " | " | sodium p-toluenesulfinate (3.0) | 34.2 |

EXAMPLE 2

The adhesive strength was measured in the same manner as described in Example 1 except that liquid (I) was prepared by using the polymer obtained in one of Production Examples 1 through 13, as shown in Table 3, instead of the polymer used in Example 1. The obtained results are shown in Table 3.

TABLE 3

| Run No. | Polymer (parts by weight) | Liquid (I) Polymerizable Vinyl Monomer (parts by weight) (F.I.) | Liquid (II) Peroxide Catalyst (parts by weight) | Amine Catalyst (parts by weight) | Promotor (parts by weight) | Adhesive Strength (Kg/cm²) to Dentin |
|---|---|---|---|---|---|---|
| 1 | copolymer of Production Example 1 (10) | 2-hydroxyethyl methacrylate (30) (1.0), triethylene glycol dimethacrylate (60) (1.5) | BPO (1) | DEPT (1.5) | sodium p-toluenesulfinate (3.0) | 38.2 |
| 2 | copolymer of Production Example 2 (5) | 2-hydroxyethyl methacrylate (30) (1.0), triethylene glycol dimethacrylate (60) (1.5) | " | " | sodium p-toluenesulfinate (3.0) | 31.6 |
| 3 | copolymer of Production Example 3 (15) | 2-hydroxyethyl methacrylate (30) (1.0), triethylene glycol dimethacrylate (60) (1.5) | " | " | sodium p-toluenesulfinate (3.0) | 37.1 |
| 4 | copolymer of Production Example 4 (12) | 2-hydroxyethyl methacrylate (30) (1.0), triethylene glycol dimethacrylate (60) (1.5) | " | " | sodium p-toluenesulfinate (3.0) | 35.5 |
| 5 | copolymer of Production Example 5 (10) | 2-hydroxyethyl methacrylate (30) (1.0), triethylene glycol dimethacrylate (60) (1.5) | " | " | sodium p-toluenesulfinate (3.0) | 24.0 |
| 6 | copolymer of Production | 2-hydroxyethyl | " | " | sodium p- | 25.4 |

TABLE 3-continued

| Run No. | Polymer (parts by weight) | Liquid (I) Polymerizable Vinyl Monomer (parts by weight) (F.I.) | Peroxide Catalyst (parts by weight) | Liquid (II) Amine Catalyst (parts by weight) | Promotor (parts by weight) | Adhesive Strength (Kg/cm²) to Dentin |
|---|---|---|---|---|---|---|
|  | Example 6 (10) | methacrylate (30) (1.0), triethylene glycol dimethacrylate (60) (1.5) |  |  | toluenesulfinate (3.0) |  |
| 7 | copolymer of Production Example 7 (5) | 2-hydroxyethyl methacrylate (30) (1.0), triethylene glycol dimethacrylate (60) (1.5) | " | " | sodium p-toluenesulfinate (3.0) | 28.9 |
| 8 | copolymer of Production Example 8 (8) | 2-hydroxyethyl methacrylate (30) (1.0), triethylene glycol dimethacrylate (60) (1.5) | " | " | sodium p-toluenesulfinate (3.0) | 19.8 |
| 9 | copolymer of Production Example 9 (10) | 2-hydroxyethyl methcrylate (30) (1.0), triethylene glycol dimethacrylate (60) (1.5) | " | " | sodium p-toluenesulfinate (3.0) | 39.1 |
| 10 | copolymer of Production Example 10 (10) | 2-hydroxyethyl methacrylate (30) (1.0), triethylene glycol dimethacrylate (60) (1.5) | " | " | sodium p-toluenesulfinate (3.0) | 30.5 |
| 11 | copolymer of Production Example 11 (10) | 2-hydroxyethyl methacrylate (30) (1.0), triethylene glycol dimethacrylate (60) (1.5) | " | " | sodium p-toluenesulfinate (3.0) | 28.8 |
| 12 | copolymer of Production Example 12 (10) | 2-hydroxyethyl methacrylate (30) (1.0), triethylene glycol dimethacrylate (60) (1.5) | " | " | sodium p-toluenesulfinate (3.0) | 37.1 |
| 13 | copolymer of Production Example 13 (10) | 2-hydroxyethyl methacrylate (30) (1.0), triethylene glycol dimethacrylate (60) (1.5) | " | " | sodium p-toluenesulfinate (3.0) | 36.5 |

EXAMPLE 3

The procedures of Example 2 (Run No. 1 in Table 3) were repeated in the same manner except that the Promotor used in Example 2 (Run No. 1 in Table 3) was changed as indicated in Table 4. The obtained results are shown in Table 4. Incidentally, Runs Nos. 4, 6 and 7, water was added for dissolution of the Promotor. The amounts added of water in Runs Nos. 4, 6 and 7 were 5, 50 and 100 parts by weight, respectively, per 100 parts by weight of the ethanol solution.

TABLE 4

| Run No. | Liquid (I) Polymer (parts by weight) | Polymerizable Vinyl Monomer (parts by weight) | Peroxide Catalyst (parts by weight) | Liquid (II) Amine Catalyst (parts by weight) | Promotor (parts by weight) | Adhesive Strength (Kg/cm²) to dentin | to enamel |
|---|---|---|---|---|---|---|---|
| 1 | SMA 1000 (10) | 2-hydroxyethyl methacrylate (30), triethylene glycol dimethacry- | BPO (1) | DEPT (1.5) | sodium p-toluenesulfinate (3.0) | 39.2 | 107.5 |

TABLE 4-continued

| Run No. | Polymer (parts by weight) | Liquid (I) Polymerizable Vinyl Monomer (parts by weight) | Peroxide Catalyst (parts by weight) | Liquid (II) Amine Catalyst (parts by weight) | Promotor (parts by weight) | Adhesive Strength (Kg/cm$^2$) to dentin | to enamel |
|---|---|---|---|---|---|---|---|
| 2 | " | late (60) 2-hydroxyethyl methacrylate (30), triethylene glycol dimethacrylate (60) | BPO (0.5) | DEPT (0.75) | sodium p-toluene-sulfinate (1.5) | 34.3 | 124.3 |
| 3 | " | 2-hydroxyethyl methacrylate (30), triethylene glycol dimethacrylate (60) | BPO (1) | DEPT (1.5) | potassium methacrylate (1.2) | 33.7 | |
| 4 | " | 2-hydroxyethyl methacrylate (30), triethylene glycol dimethacrylate (60) | " | " | potassium methacrylate (3.0) | 38.3 | 113.1 |
| 5 | " | 2-hydroxyethyl methacrylate (30), triethylene glycol dimethacrylate (60) | " | " | sodium p-toluene-sulfinate (1.0), potassium methacrylate (1.0) | 29.8 | |
| 6 | " | 2-hydroxyethyl methacrylate (30), triethylene glycol dimethacrylate (60) | " | DEPT (2.3) | sodium laurate (4.5) | 15.7 | |
| 7 | " | 2-hydroxyethyl methacrylate (30), triethylene glycol dimethacrylate (60) | " | DEPT (3.0) | copper acetate (6.0) | 21.4 | |

EXAMPLE 4

Liquids (I), (II) and (III) shown in Table 5 were prepared by using a commercially available styrene/maleic anhydride copolymer (SMA 1000), a polymerizable vinyl compound shown in Table 5, tetra-n-butyl titanate (TBT) as the organic titanate compound, β-hydroxyethyl methacrylate as the stabilizer for the organic titanate compound and sodium p-toluene-sulfinate as the promotor. Incidentally, each of the amounts of the organic titanate compound, stabilizer and promotor used for the liquids (II) and (III) is expressed as parts by weight per 100 parts by weight of ethanol. The adhesive strength was measured by using liquids (I), (II) and (III) shown in Table 5 in the same manner as described in Example 1. The obtained results are shown in Table 5.

TABLE 5

| Run No. | Polymer (parts by weight) | Liquid (I) Polymerizable Vinyl Compound (parts by weight (F.I.) | Peroxide Catalyst (parts by weight) | Liquid (II) Organic Titanate Compound (parts by weight) | Stabilizer (parts by weight) | Liquid (III) Amine Catalyst (parts by weight) | Promotor (parts by weight) | Adhesive Strength (Kg/cm$^2$) to Dentin |
|---|---|---|---|---|---|---|---|---|
| 1 | SMA 1000 (10) | 2-hydroxyethyl methacrylate (90) (1.0) | BPO (1) | TBT (2) | 2-hydroxyethyl methacrylate (1) | DEPT (1.5) | sodium p-toluene-sulfinate (3.0) | 30.1 |
| 2 | SMA 1000 (10) | 2-hydroxyethyl methacrylate (30) (1.0), triethylene glycol dimethacrylate (60) (1.5) | " | " | 2-hydroxyethyl methacrylate (1) | " | sodium p-toluene-sulfinate (3.0) | 43.2 |
| 3 | SMA 1000 (10) | 2-hydroxyethyl methacrylate (25) (1.0), triethylene glycol dimethacrylate (55) (1.5), bis-GMA (35) (1.6) | " | " | 2-hydroxyethyl methacrylate (1) | " | sodium p-toluene-sulfinate (3.0) | 39.0 |
| 4 | SMA 1000 (10) | triethylene glycol dimethacrylate (15) (1.5), bis-GMA (21) (1.6), trifunctional monomer (54) (2.6) | " | " | 2-hydroxyethyl methacrylate (1) | " | sodium p-toluene-sulfinate (3.0) | 35.0 |
| 5 | SMA 1000 (10) | triethylene glycol dimethacrylate (15) (1.5), bis-GMA (21) (1.6), polyfunctional monomer (54) (2.9) | " | " | 2-hydroxyethyl methacrylate (1) | " | sodium p-toluene-sulfinate (3.0) | 38.0 |

EXAMPLE 5

Liquids (I) and (II) shown in Table 6 were prepared by using the styrene-maleic acid copolymer prepared in Production Example 1, a polymerizable vinyl compound shown in Table 6, tetra-n-butyl titanate (TBT) as the organic titanate compound, o-ethoxybenzoic acid as the stabilizer for the organic titanate compound and sodium p-toluene-sulfinate as the promotor. Incidentally, in the liquids (I) and (II), each of the amounts of the polymer, organic titanate compound, stabilizer and promotor is expressed as parts by weight per 100 parts by weight of ethanol. Equal amounts of the liquids (I) and (II) were mixed, and the adhesive strength was measured in the same manner as described in Example 1. The obtained results are shown in Table 6.

EXAMPLE 6

Liquids (I), (II) and (III) shown in Table 7 were prepared by using one of the copolymers obtained in Production Examples 1 through 13, 2-hydroxyethyl methacrylate/triethylene glycol dimethacrylate as the polymerizable vinyl compound, tetra-n-butyl titanate as the organic titanate compound, eugenol as the titanate stabilizer and sodium p-toluene-sulfinate as the promotor. Incidentally, in the liquid (I), each of the amounts of the ingredients is repressed as parts by weight per 20 parts by weight of ethanol, and in the liquids (II) and (III), each of the amounts of the ingredients is expressed as parts by weight per 100 parts by weight of ethanol. The liquids (I), (II) and (III) were mixed and the adhesive strength was measured in the same manner as described in Example 1. The obtained results are shown in Table 7.

TABLE 6

| | Liquid (I) | | | | Liquid (II) | | |
| --- | --- | --- | --- | --- | --- | --- | --- |
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength ($Kg/cm^2$) to Dentin |
| 1 | copolymer of Production Example 1 (5.3) | 2-hydroxyethyl methacrylate (100) | BPO (1) | tetra-n-butyl titanate (1.1) | o-ethoxy-benzoic acid (0.6) | DEPT (1.5) | sodium p-toluene-sulfinate (3.0) | 30.3 |
| 2 | copolymer of Production Example 1 (5.3) | 2-hydroxyethyl methacrylate (50), glycerin dimethacrylate (50) | " | tetra-n-butyl titanate (1.1) | o-ethoxy-benzoic acid (0.6) | " | sodium p-toluene-sulfinate (3.0) | 41.3 |

TABLE 7

| | Liquid (I) | | | Liquid (II) | | Liquid (III) | | |
| --- | --- | --- | --- | --- | --- | --- | --- | --- |
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength ($Kg/cm^2$) to Dentin |
| 1 | copolymer of Production Example 1 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 41.5 |
| 2 | copolymer of Production Example 2 (5) | 2-hydroxyethyl methacrylate (30), triethylene glycol dimethacrylate (60) | BPO (1) | tetra-n-butyl titanate (1) | eugenol (0.5) | DEPT (1.5) | sodium p-toluene-sulfinate (3.0) | 34.6 |
| 3 | copolymer of Production Example 3 (15) | 2-hydroxyethyl methacrylate (30), triethylene glycol dimethacrylate (60) | BPO (1) | tetra-n-butyl titanate (3) | eugenol (1.5) | DEPT (1.5) | sodium p-toluene-sulfinate (3.0) | 40.2 |
| 4 | copolymer of Production Example 4 (12) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 38.7 |
| 5 | copolymer of Production Example 5 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 28.0 |
| 6 | copolymer of Production Example 6 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 29.0 |
| 7 | copolymer of Production Example 7 (5) | 2-hydroxyethyl methacrylate (30), triethylene | BPO (1) | tetra-n-butyl titanate (2) | eugenol (1) | DEPT (1.5) | sodium p-toluene-sulfinate (3.0) | 32.5 |

TABLE 7-continued

| | Liquid (I) | | Liquid (II) | | | Liquid (III) | | |
|---|---|---|---|---|---|---|---|---|
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength (Kg/cm²) to Dentin |
| 8 | copolymer of Production Example 8 (8) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 24.1 |
| 9 | copolymer of Production Example 9 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 42.5 |
| 10 | copolymer of Production Example 10 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 33.9 |
| 11 | copolymer of Production Example 11 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 32.5 |
| 12 | copolymer of Production Example 12 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 40.8 |
| 13 | copolymer of Production Example 13 (10) | 2-hydroxyethyl methacrylate (30), triethylene glycol dimethacrylate (60) | BPO (1) | tetra-n-butyl titanate (2) | eugenol (1) | DEPT (1.5) | sodium p-toluene-sulfinate (3.0) | 40.1 |

EXAMPLE 7

Liquids (I), (II) and (III) shown in Table 8 were prepared by using the copolymer of Production Example 1, 2-hydroxyethyl methacrylate/triethylene glycol dimethacrylate as the polymerizable vinyl compound, an organic titanate compound shown in Table 8, o-ethoxybenzoic acid as the stabilizer and sodium p-toluene-sulfinate as the promotor. The liquids (I), (II) and (III) were mixed at a time, and the adhesive strength was measured in the same manner as described in Example 1. The obtained results are shown in Table 8. Incidentally, in the liquid (I), each of the amounts of the ingredients is expressed as parts by weight per 10 parts by weight of ethanol, and in the liquids (II) and (III), each of the amounts of the ingredients is expressed as parts by weight per 100 parts by weight of ethanol.

TABLE 8

| | Liquid (I) | | Liquid (II) | | | Liquid (III) | | |
|---|---|---|---|---|---|---|---|---|
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength (Kg/cm²) to Dentin |
| 1 | copolymer of Production Example 1 (10) | 2-hydroxyethyl methacrylate (30), triethylene glycol dimethacrylate (60) | BPO (1) | tetra-n-butyl titanate (2) | o-ethoxybenzoic acid (1) | DEPT (1.5) | sodium p-toluene-sulfinate (3.0) | 41.3 |
| 2 | copolymer of Production Example 1 (10) | 2-hydroxyethyl methacrylate (30), triethylene glycol dimethacrylate (60) | BPO (1) | tetraisopropyl titanate (2) | o-ethoxybenzoic acid (1) | DEPT (1.5) | sodium p-toluene-sulfinate (3.0) | 41.5 |
| 3 | copolymer of Production Example 1 (10) | 2-hydroxyethyl methacrylate (30), triethylene glycol dimethacrylate (60) | BPO (1) | tetrakis(2-ethylhexyl) titanate (2) | o-ethoxybenzoic acid (1) | DEPT (1.5) | sodium p-toluene-sulfinate (3.0) | 40.8 |
| 4 | copolymer of Production Example 1 (10) | 2-hydroxyethyl methacrylate (30), triethylene glycol dimethacrylate (60) | BPO (1) | dimer of tetra-n-butyl titanate (2) | o-ethoxybenzoic acid (1) | DEPT (1.5) | sodium p-toluene-sulfinate (3.0) | 40.5 |
| 5 | copolymer of Production Example 1 (10) | 2-hydroxyethyl methacrylate | BPO (1) | dimer of tetra-n- | o-ethoxybenzoic acid (1) | DEPT (1.5) | sodium p-toluene-sulfinate (3.0) | 39.9 |

TABLE 8-continued

| | Liquid (I) | | Liquid (II) | | | Liquid (III) | | |
|---|---|---|---|---|---|---|---|---|
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength (Kg/cm$^2$) to Dentin |
| 6 | copolymer of Production Example 1 (10) | 2-hydroxyethyl methacrylate (30), triethylene glycol dimethacrylate (60) | BPO (1) | butyl titanate (3) tetramer of tetra-n-butyl titanate (2) | o-ethoxybenzoic acid (1) | DEPT (1.5) | sodium p-toluenesulfinate (3.0) | 40.2 |

EXAMPLE 8

Liquids (I), (II) and (III) shown in Table 9 were prepared by using the styrene/maleic acid copolymer of Production Example 1, 2-hydroxyethyl methacrylate/triethylene glycol dimethacrylate as the polymerizable vinyl compound, tetra-n-butyl titanate (TBT) as the organic titanate compound, 2-hydroxyethyl methacrylate as the stabilizer for the organic titanate compound and a promotor shown in Table 9. Incidentally, in the liquid (I) each of the amounts of the ingredients is expressed as parts by weight per 10 parts by weight of ethanol, and in the liquids (II) and (III), each of the amounts of the ingredients is expressed as parts by weight per 100 parts by weight of ethanol. Equal amounts of the liquids (I), (II) and (III) were mixed at a time, and the adhesive strength was measured in the same manner as described in Example 1. The obtained results are shown in Table 9.

EXAMPLE 9

By using liquids (I) and (II) for the first treatment, shown in Table 10, an untreated dentin of a bovine tooth was subjected to the coating treatment in the same manner as described in Example 1. Then, the coated surface was further coated with a liquid mixture of liquids (I') and (II') for the second treatment, shown in Table 10. Namely, liquid (I') comprising 10 parts by weight of a commercially available styrene/maleic anhydride copolymer (SMA 1000), 90 parts by weight of 2-hydroxyethyl methacrylate and 1 part by weight of BPO was mixed with liquid (II') comprising 1.5 parts by weight of DEPT, 3.0 parts by weight of sodium p-toluene-sulfinate and 100 parts by weight of ethanol at a ratio of 1:1, and the resulting liquid mixture was coated on the coated surface of the tooth. The adhesive test was carried out in the same manner as described in Example 1. The obtained results are shown in Table 10.

TABLE 9

| | Liquid (I) | | Liquid (II) | | | Liquid (III) | | |
|---|---|---|---|---|---|---|---|---|
| Run No. | Polymer (parts by weight) | Polymerizable Vinyl Compound (parts by weight) | Peroxide Catalyst (parts by weight) | Organic Titanate Compound (parts by weight) | Stabilizer (parts by weight) | Amine Catalyst (parts by weight) | Promotor (parts by weight) | Adhesive Strength (Kg/cm$^2$) to Dentin |
| 1 | copolymer of Production Example 1 (10) | 2-hydroxyethyl methacrylate (30), triethylene glycol dimethacrylate (60) | BPO (1) | tetra-n-butyl titanate (2) | 2-hydroxyethyl methacrylate (1) | DEPT (1) | sodium p-toluenesulfinate (3.0) | 41.5 |
| 2 | copolymer of Production Example 1 (10) | 2-hydroxyethyl methacrylate (30), triethylene glycol dimethacrylate (60) | BPO (1) | tetra-n-butyl titanate (2) | 2-hydroxyethyl methacrylate (1) | DEPT (1) | potassium methacrylate (1.2) | 40.5 |
| 3 | copolymer of Production Example 1 (10) | 2-hydroxyethyl methacrylate (30), triethylene glycol dimethacrylate (60) | BPO (1) | tetra-n-butyl titanate (2) | 2-hydroxyethyl methacrylate (1) | DEPT (1) | sodium p-toluenesulfinate (1.0), potassium methacrylate (1.0) | 32.7 |

TABLE 10

| | First Treatment | | | Second Treatment | | | | | |
|---|---|---|---|---|---|---|---|---|---|
| | Liquid (I) | Liquid (II) | | Liquid (I') | | Liquid (II') | | | |
| Run No. | Polymer (parts by weight) | Organic Titanate (parts by weight) | Stabilizer (parts by weight) | Polymer (parts by weight) | Polymerizable Vinyl Compound (parts by weight) | Peroxide Catalyst (parts by weight) | Amine Catalyst (parts by weight) | Promotor (parts by weight) | Adhesive Strength (Kg/cm$^2$) to Dentin |
| 1 | copolymer of Production Example 1 (10) | tetra-n-butyl titanate (2) | lactic acid (1) | SMA-1000 (10) | 2-hydroxyethyl methacrylate (30), triethylene glycol dimethacrylate (60) | BPO (1) | DEPT (1.5) | sodium p-toluenesulfinate (3.0) | 45.6 |

TABLE 10-continued

| | First Treatment | | Second Treatment | | | | | |
| | | | Liquid (I') | | | Liquid (II') | | |
| | | Liquid (II) | | | | | | |
| Run No. | Liquid (I) Polymer (parts by weight) | Organic Titanate (parts by weight) | Stabilizer (parts by weight) | Polymer (parts by weight) | Polymerizable Vinyl Compound (parts by weight) | Peroxide Catalyst (parts by weight) | Amine Catalyst (parts by weight) | Promotor (parts by weight) | Adhesive Strength (Kg/cm²) to Dentin |
|---|---|---|---|---|---|---|---|---|---|
| 2 | copolymer of Production Example 1 (10) | tetra-n-butyl titanate (2) | 2-hydroxyethyl methacrylate (1) | SMA-1000 (10) | 2-hydroxyethyl methacrylate (30), triethylene glycol dimethacrylate (60) | BPO (1) | DEPT (1.5) | sodium p-toluenesulfinate (3.0) | 46.0 |
| 3 | copolymer of Production Example 1 (10) | tetra-n-butyl titanate (2) | eugenol (1) | SMA-1000 (10) | 2-hydroxyethyl methacrylate (30), triethylene glycol dimethacrylate (60) | BPO (1) | DEPT (1.5) | sodium p-toluenesulfinate (3.0) | 45.0 |
| 4 | copolymer of Production Example 1 (10) | tetra-n-butyl titanate (2) | proline (1) | SMA-1000 (10) | 2-hydroxyethyl methacrylate (30), triethylene glycol dimethacrylate (60) | BPO (1) | DEPT (1.5) | sodium p-toluenesulfinate (3.0) | 38.5 |
| 5 | copolymer of Production Example 1 (10) | tetra-n-butyl titanate (2) | o-ethoxybenzoic acid (1) | SMA-1000 (10) | 2-hydroxyethyl methacrylate (30), triethylene glycol dimethacrylate (60) | BPO (1) | DEPT (1.5) | sodium p-toluenesulfinate (3.0) | 48.9 |
| 6 | copolymer of Production Example 1 (10) | tetra-n-butyl titanate (2) | β-hydroxybutyric acid | SMA-1000 (10) | 2-hydroxyethyl methacrylate (30), triethylene glycol dimethacrylate (60) | BPO (1) | DEPT (1.5) | sodium p-toluenesulfinate (3.0) | 44.1 |

We claim:

1. An adhesive coating material for a hard tissue, which comprises (1) a polymer having an acid value of 30 to 700 and comprising repeating units including a hydrophobic group and repeating units including two carboxyl (—COOH) groups or one carboxylic anhydride

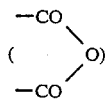

group bonded to the polymer, said carboxyl groups or carboxylic anhydride group being bonded to adjacent carbon atoms, (2) a polymerizable vinyl compound represented by the following formula

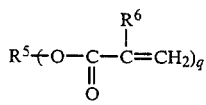

wherein $R^5$ stands for an organic group free of an ethylenic unsaturation, $R^6$ stands for a hydrogen atom or an alkyl group, and q is an integer of from 1 to 4, or a mixture of said polymerizable vinyl compound and an organic titanate compound, a radical initiator comprising (3) and (4): (3) an organic peroxide, (4) an amine compound and (5) as a promoter, a sulfinic acid salt and/or a carboxylic acid salt.

2. An adhesive coating maerial as set forth in claim 1, wherein the hydrophobic group present in the molecule of the polymer is in an amount of 0.7 to 9.0 moles per mole of the two carboxyl groups or one carboxylic anhydride group.

3. An adhesive coating material as set forth in claim 1, wherein the average molecular weight of the polymer is 1,000 to 100,000.

4. An adhesive coating material as set forth in claim 1, wherein the hydrophobic group is at least one member selected from the group consisting of aryl groups, alkyl groups, alkoxy groups and acyloxy groups.

5. An adhesive coating material as set forth in claim 1, wherein the polymer is a copolymer comprising a vinyl monomer having a hydrophobic group and a vinyl monomer having two carboxyl groups or one carboxylic anhydride group bonded to adjacent carbon atoms.

6. An adhesive coating material as set forth in claim 5, wherein the vinyl monomer having a hydrophobic group is a monomer represented by the following general formula:

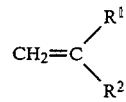

wherein $R^1$ stands for a hydrogen atom or an alkyl group, and $R^2$ stands for an aryl group, an alkyl group, an alkoxy group or an acyloxy group.

7. An adhesive coating material as set forth in claim 5, wherein the vinyl monomer having two carboxyl groups or one carboxylic anhydride group bonded to adjacent carbon atoms is a member selected from the group consisting of maleic acid, fumaric acid, itaconic acid and anhydrides thereof.

8. An adhesive coating material as set forth in claim 1, wherein the polymer comprises (A) at least one kind of monomeric units represented by the following formula:

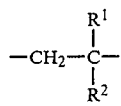

wherein $R^1$ stands for a hydrogen atom or an alkyl group, and $R^2$ stands for an aryl group, an alkyl group, an alkoxy group, an acyloxy group, or an alkoxycarbonyl group,
and (B) at least one kind of monomeric units represented by the following formula:

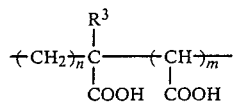

wherein $R^3$ stands for a hydrogen atom or a carboxymethyl group, n and m are numbers of zero or 1, with the proviso that when n is zero, m is 1 and $R^3$ is a hydrogen atom and when n is 1, m is zero and $R^3$ is a carboxymethyl group, and the two carboxyl groups may form a carboxylic acid anhydride group.

9. An adhesive coating material as set forth in claim 1, which comprises as component (2) the mixture of the polymerizable vinyl compound and the organic titanate compound and wherein the organic titanate compound is a titanate represented by the following formula:

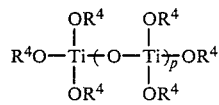

wherein $R^4$ stands for an alkyl group and p is a number of from 0 to 20.

10. An adhesive coating material as set forth in claim 1, which comprises as component (2) the mixture of the polymerizable vinyl compound and the organic titanate compound and wherein the organic titanate compound is a tetraalkyl titanate.

11. An adhesive coating material as set forth in claim 1, wherein in the mixture of the polymer and the polymerizable vinyl compound, the polymer is contained in an amount of 0.1 to 40% by weight based on the polymerizable vinyl compound.

12. An adhesive coating maerial as set forth in claim 1, wherein (I) the polymer, the polymerizable vinyl compound and the organic peroxide and (II) and amine compound and the sulfinic acid salt and/or the carboxylic acid salt are contained in different vessels, if necessary after dissolution in a solvent, and the components (I) and (II) are mixed at the time of application.

13. An adhesive coating material for a hard tissue, which comprises (1) a polymer having an acid value of 30 to 700 and comprising repeating units including a hydrophobic group and repeating units including wo carboxyl (—COOH) groups or one carboxylic anhydride

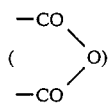

group bonded fo the polymer, said carboxyl groups or carboxylic anhydride group being bonded to adjacent carbon atoms, (2) a polymerizable vinyl compound represented by the following formula

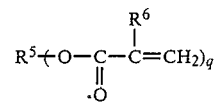

wherein $R^5$ stands for an organic group free of an ethylenic unsaturation, $R^6$ stands for a hydrogen atom or an alkyl group, and q is an integer of from 1 to 4, (3) an organic titanate compound, (4) a stabilizer for the organic titanate compound, a radical initiator comprising (5) and (6): (5) an organic peroxide, (6) an amine compound and (7) as a promoter a sulfinic acid salt and/or a carboxylic acid salt.

14. An adhesive coating material as set forth in claim 13, wherein (I) the polymer, the polymerizable vinyl monomer, the organic titanate compound, the stabilizer for the organic titanate compound and the organic peroxide and (II) the amine compound and the sulfinic acid salt and/or the carboxylic acid salt are contained in different vessels, if necessary after dissolution in a solvent, and the components (I) and (II) are mixed at the time of application.

15. An adhesive coating material as set forth in claim 13, wherein (I) the polymer, the polymerizable vinyl compound and the organic peroxide, (II) the organic titanate compound and the stabilizer for the organic titanate compound and (III) the amine compound and the sulfinic acid salt and/or the carboxylic acid salt are contained in different vessels, if necessary after dissolution in a solvent, and the components (I), (II) and (III) are mixed at the time of application.

16. An adhesive coating material as set forth in claim 13, wherein the stabilizer for the organic titanate compound is an o-alkoxybenzoic acid or β-hydroxycarboxylic acid.

17. An adhesive coating material as set forth in claim 13, wherein the stabilizer for the organic titanate compound is at least one member selected from the group consisting of α-hydroxycarboxylic acids, β-hydroxyalkyl acrylates, β-hydroxyalkyl methacrylates, catechol, guaniacol, eugenol, proline, 4-methylene proline, 4-methyl proline and cyclic esters.

18. An adhesive coating material for a hard tissue as set forth in claim 1, wherein the polymerizable vinyl compound or at least one polymerizable vinyl compound when a plurality of polymerizable vinyl compounds are used is a vinyl compound having at least two ethylenic unsaturations.

19. An adhesive coating material for a hard tissue as set forth in claim 1, wherein one or more of polymerizable vinyl compounds is used so that the functional index (F.I.) defined by the following formula:

$$F.I. = \sum_{n=1}^{n} m \cdot Mm$$

wherein m stands for the number of vinyl groups in the vinyl compound and Mm stands for a molar fraction of the vinyl compound containing m of vinyl groups,
is 1.1 to 3.3.

20. An adhesive coating material as set forth in claim 16, wherein said solvent is ethanol.

21. An adhesive coating material as set forth in claim 8, wherein the amount of the monomeric units (A) is in the range of from 40 to 90 mole% of the polymer.

22. An adhesive coating material as set forth in claim 21 which comprises about 0.1 to 40% by weight of the polymer (1) based on the polymerizable vinyl compound (2); 0.02 to 2 moles of the organic titanate compound per mole of the repeating unit of the polymer which includes the two carboxyl groups or one carboxylic anhydride group; about 0.01 to 3% by weight based on the polymerizable vinyl compound (2) of the organic peroxide (3) and amine compound (4) and about 0.1 to 4 moles per mole of the organic titanate compound of the sulfinic acid salt and/or carboxylic acid salt (5).

23. A dental restorative material capable of bonding directly to dentin which comprises
(1) a polymer having an acid value in the range of 40 to 600 which is selected from the group consisting of styrene-maleic acid copolymer, styrene-maleic anhydride copolymer, propylene-maleic acid copolymer, isobutene-maleic acid copolymer, n-butylvinyl-ether-maleic acid copolymer, n-octadecyl-vinyl ether-maleic acid copolymer, styrene-itaconic acid copolymer, styrene-fumaric acid copolymer, vinyl acetate-maleic acid copolymer, p-chlorostyrene-maleic acid copolymer, and p-chloromethylstyrene-maleic acid copolymer;
(2) at least one polymerizable vinyl compound selected from the group consisting of
2-hydroxyethyl methacrylate,
triethylene glycol dimethacrylate,
bisphenol-A-diglycidyl methacrylate,

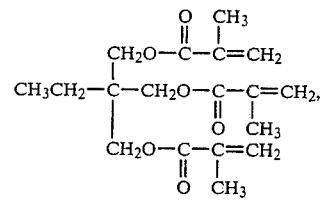

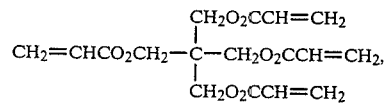

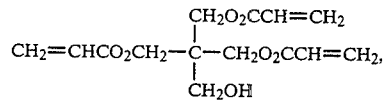

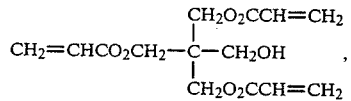

glycerin dimethacrylate, and
mixtures thereof;
(3) a radical initiator comprising a mixture of dibenzoyl peroxide and an amine compound selected from the group consisting of N,N'-dimethylaniline, N,N'-dimethyltoluidine, N,N'-dimethyl-p-($\beta$-hydroxyethyl)-aniline, and N,N'-di($\beta$-hydroxyethyl)-p-toluidine; and
(4) at least one polymerization promoter selected from the group consisting of sodium p-toluene sulfinate, potassium methacrylate, sodium laurate, copper acetate, and mixtures thereof.

24. The dental restorative material of claim 23 which further comprises
(5) an organic titanate compound selected from the group consisting of tetra-n-butyl titanate, tetraisopropyl titanate, tetrakisethylhexyl titanate, dimer of tetra-n-butyl titanate, and tetramer of tetra-n-butyl titanate, and
(6) a stabilizer for said organic titanate selected from the group consisting of $\beta$-hydroxyethyl methacrylate, o-ethoxybenzoic acid, eugenol, lactic acid, proline, and $\beta$-hydroxybutyric acid.

* * * * *

UNITED STATES PATENT AND TRADEMARK OFFICE
CERTIFICATE OF CORRECTION

PATENT NO. : 4,535,102
DATED : August 13, 1985
INVENTOR(S) : KOSHI KUSUMOTO, ET AL.

It is certified that error appears in the above-identified patent and that said Letters Patent is hereby corrected as shown below:

IN THE CLAIMS

Claim 13, line 4, delete "wo", insert --two--.

Claim 20, line 2, delete "16", insert --12--.

Signed and Sealed this

Twelfth Day of November 1985

[SEAL]

Attest:

Attesting Officer

DONALD J. QUIGG

Commissioner of Patents and Trademarks